June 4, 1935.  H. C. HARRISON  2,003,440
VIBRATION ABSORBING WORM
Filed Nov. 19, 1931
FIG. 1
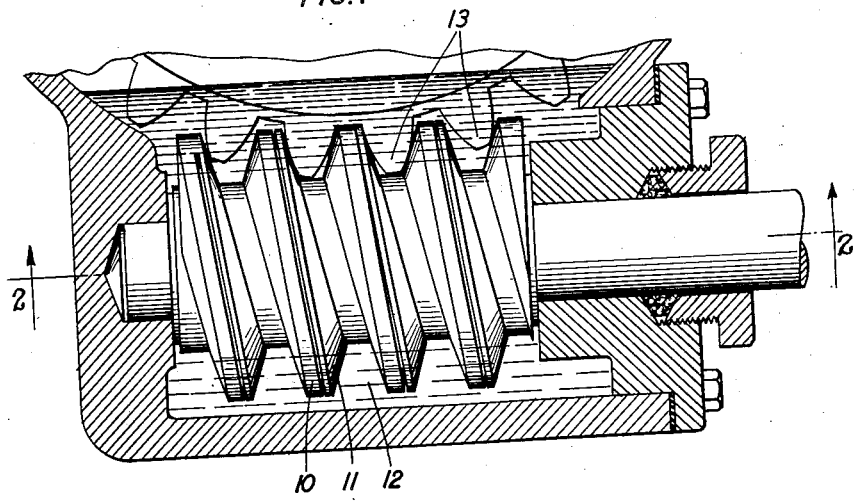
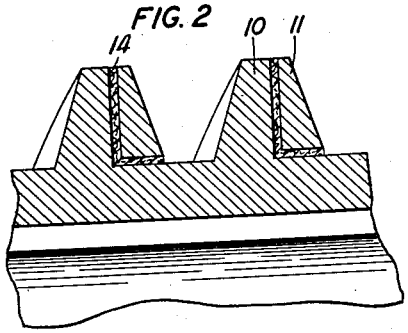
FIG. 2
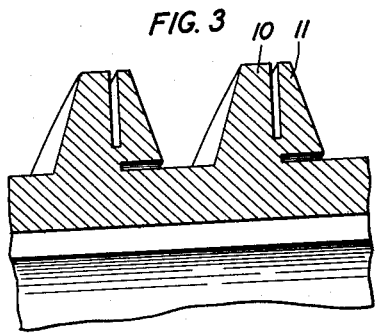
FIG. 3
FIG. 4
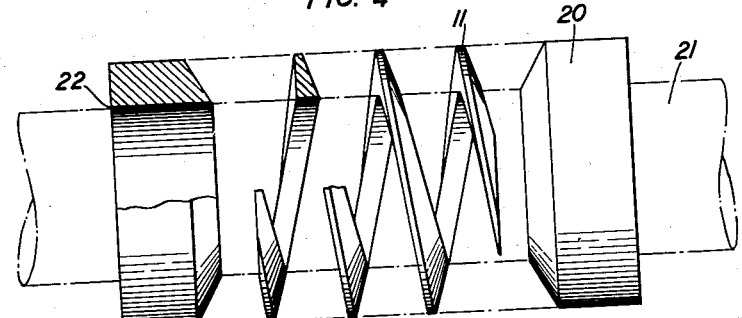
INVENTOR
H. C. HARRISON
BY
ATTORNEY Patented June 4, 1935

2,003,440

UNITED STATES PATENT OFFICE 2,003,440

VIBRATION ABSORBING WORM

Henry C. Harrison, Port Washington, N. Y., assignor to Bell Telephone Laboratories, Incorporated, New York, N. Y., a corporation of New York Application November 19, 1931, Serial No. 575,983

4 Claims. (Cl. 74—458)

This invention relates to toothed gearing devices and particularly to those used in machines requiring smooth and vibrationless power transmission.

At the present time it is practically impossible even at great expense to make worms and gears of such a perfection that with light loads and ordinary speeds the contact surfaces will not separate and come together to give rise to vibrations which are difficult and expensive to eliminate. Again, with heavier loads and low speeds the successive meshing of the gear teeth also causes vibrations, which, in the case of electric power railway cars, for instance, produces objectionable noise and uneven wearing of the rails.

The object of this invention is to eliminate substantial vibrations in the driven member of a gear train.

In general the object is attained by providing the driving member with teeth of a novel construction such that the contacting surface of each tooth is separated from the remainder of the tooth and is movable relative thereto. The separation may be such that the oil present for lubrication will serve as a damping medium interposed between the movable surface and the remainder of the tooth to check the motion of the surface.

A driving member in the form of a worm incorporating these features is illustrated in the accompanying drawing in which:

Fig. 1 shows such a worm driving a wheel;

Fig. 2 is a cross-sectional view of the worm;

Fig. 3 is a cross-sectional view of the worm in the process of making before the contacting surface of the thread has been completely separated from the tooth; and Fig. 4 is a view showing another method of making a separate contacting surface for the worm.

Referring to Fig. 1, 10 is the worm proper and 11 is the portion of the thread which is separated from the worm by a damping medium 12, at all points except at the ends where it is rigidly joined to the worm. The separated portion 11 is comprised of a spring-like member of trapezoidal cross-section, the sloping side of which forms the contacting surface of the worm and, therefore, has the contour of the face of a standard worm thread. The width of the upper base is determined by the amount of power to be transmitted and is made large enough so that the member will have sufficient strength to resist substantial radial displacement. It should not be made too large since its strength is obtained at the expense of the remainder of the tooth, which must be capable of withstanding the heavy starting pressures. It may be desirable in some cases to make the spiral spring 11 rather thin and to use several such springs side by side. This results in thinner oil gaps with more damping and also a more gradual absorption of sudden increases in driving pressure, thereby relieving the solid portion 10 of destructive shocks. The flexible portion 11 is free to move longitudinally relative to the remainder of the worm at all points except at the ends, where it is rigidly secured to the worm.

The chamber in which the contacting surfaces of the worm and wheel are contained is filled with oil 12 so that as the worm rotates and successive teeth 13 of the wheel are made to engage with it, the face 11 of the thread is moved longitudinally with a reciprocating motion caused by the pressure of the teeth 13 in one direction and the restoring force of the spring 11 in the opposite direction and the oil 12 is alternately pumped out of and drawn into the space between the two parts of the thread. The resistance to motion offered by the oil 12 constitutes a damping force for the spring 11 by which oscillations set up in the spring by the teeth 13 are checked. In place of the oil 12 or in combination with it other substances such as felt may be used to secure this damping effect. A helix of felt 14 adapted to act as a damping medium is shown in Fig. 2 between portions 10 and 11 of the worm.

A worm of this type can be constructed by either of two methods, the first of which is by actually severing the contacting portion 11 of the thread 10 from the remainder of the thread with a cut-off tool and the second is by constructing each portion separately and subsequently assembling them to form a complete unit.

The first method is illustrated in Fig. 3. A standard shaped thread 10 is cut of a thickness great enough to carry the expected load when a portion of the thread is removed in accordance with this invention. The thread 10 is then undercut at the base and the portion containing the face is separated from the remainder by a narrow cut-off tool working from the top, leaving the face 11 free except at the ends.

The second method is illustrated in Fig. 4 and consists essentially in forming the spring-like member 11 from a tube 20 which is held in place on a mandrel 21 by a suitable solder 22. The solder 22 is coextensive with the inner surface of the tube 20. The flexible portion 11 of the thread is now cut from this tube 20 and the undesirable material of the tube is removed down to the solder without loosening the portion 11 from the mandrel. When the flexible portion is finished the solder is melted away and the tube and shaped portion is removed from the mandrel. The remainder of the worm is first cut like a standard worm and then shaped to receive the flexible portion. The latter is secured to the worm by welding or in any other suitable way attaching its ends to the worm. Where large quantities of similar sized worms are made, each of the above parts can be made long enough for several worms and then cut up into smaller pieces of the required length, thus eliminating unnecessary duplication of operations.

This method of reducing vibrations is simpler than and superior to methods in which the mass of the gear is set oscillating by mechanical irregularities and the energy of oscillation is then absorbed and filtered out from the adjacent part. It lends itself most readily to worms, particularly those used in constant speed devices such as phonographs and sound picture machines, but it can be adapted with slight modifications to pinions and gears as well. For example, the teeth of a gear can be made of two parts, one rigid and the other secured to a pair of movable rings disposed one on either side of the gear and the rings can be held in place by springs, thus simulating the worm just described.

Although the vibration eliminating effect is secured only when the worm shown is rotating in one direction, it is possible to add a similar flexible member to the opposite side of the thread and render it effective for either direction of rotation. It may also be desirable to change the shape of the flexible member to obtain greater or less damping. This invention, therefore, is not to be limited to the illustrative examples shown above, but is to be determined by the appended claims.

What is claimed is:

1. In a rotatable positive drive device engaging means on the device having separate yieldable contact surfaces, rigid supporting members therefor, and a felt damping medium interposed between said surfaces and the supporting members.

2. In a worm drive, a thread on the worm having a partly detached portion comprising the contact surface, said portion forming a freely flexed spring supported at the ends by the body of the thread.

3. In a worm drive, a thread on the worm having a partly detached portion comprising the contact surfaces, and a felt damping medium placed between said detached portion and thread.

4. In a worm drive, a thread on the worm having a plurality of partly detached flexible portions, one of which comprises the contact surface and the remaining portions being interposed between the contact surface and the thread to gradually absorb pressures transmitted through the contact surface to the thread, and a damping medium between the partly detached portions and the thread.

HENRY C. HARRISON.